March 2, 1954
J. C. O'BRIEN
2,671,166
RADIO COMMUNICATIONS SYSTEM
Filed July 1, 1950
3 Sheets-Sheet 1
FIG. 1. BLOCK DIAGRAM OF TYPICAL STATION
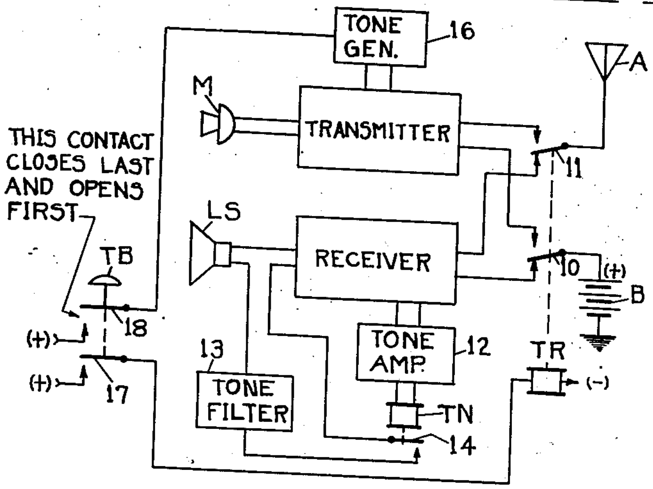
FIG. 1A.
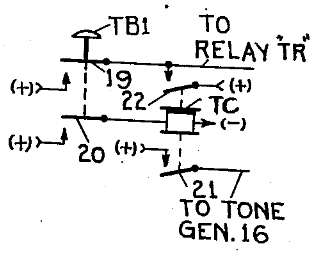
FIG. 2. GENERAL ORGANIZATION OF SYSTEM
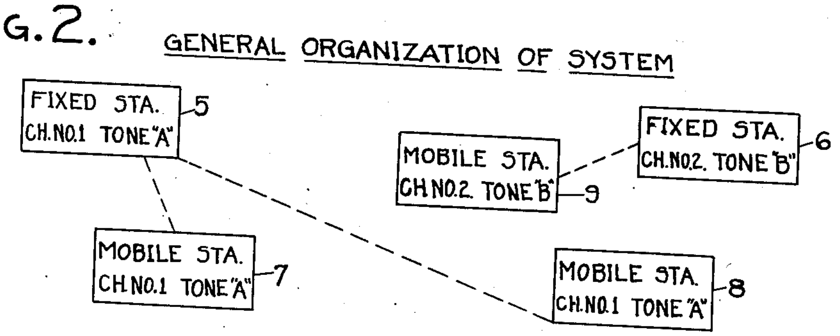
FIG. 3. TONE RELAY ORGANIZATION
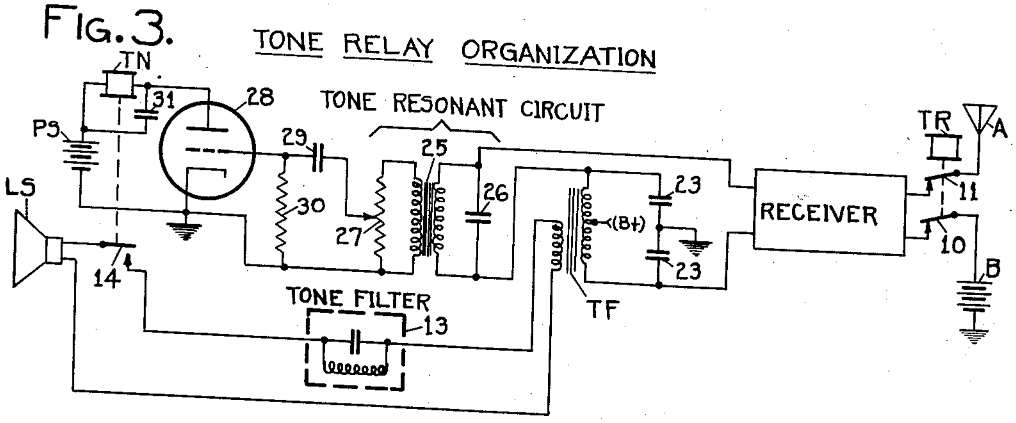
Inventor
J. C. O'Brien,
By Neil W. Preston,
his Attorney

TYPICAL STATION F.M. SIG. + A.M. TONE

1ST LIMITER

J. C. O'Brien, Inventor

By Neil W. Preston, his Attorney

March 2, 1954

J. C. O'BRIEN 2,671,166

RADIO COMMUNICATIONS SYSTEM

Filed July 1, 1950

3 Sheets-Sheet 3

J. C. O'Brien, Inventor

By Neil W. Preston, his Attorney

Patented Mar. 2, 1954

2,671,166

UNITED STATES PATENT OFFICE 2,671,166

RADIO COMMUNICATIONS SYSTEM

John C. O'Brien, Rochester, N. Y., assignor to General Railway Signal Company, Rochester, N. Y.

Application July 1, 1950, Serial No. 171,635

5 Claims. (Cl. 250—6)

This invention relates to radio communications systems, and more particularly pertains to radio communication systems adapted to provide communication between mobile stations and also between a fixed station and mobile stations.

In providing radio communications systems for mobile stations, it is usual to provide what is known as a squelch circuit control in each receiver, so that during the absence of a signal, the receiver will suppress the noise which is inherently produced when no signal is present. Such noise may be due either to external radio noise or noise voltages which are produced within the receiver itself. When such a squelch circuit control is used, the termination of a signal from a sending station results in a so-called "noise tail" or a "crash" which is caused by the time constant of the circuit when the receiver is rendered ineffective. The use of a squelch control of the usual type is also dependent upon the reception of a signal above a predetermined value. This value must be selected sufficiently high to prevent the reception of strong noise voltages from opening the receiver, but in some cases, a signal below that level might be readily intelligible if the noise were at a low level. In other words, the squelch control must be set to suppress noise for the worst conditions, but there are some locations where the noise level is relatively low, and in such locations of the movable receiver it is a hardship for the receiver to be closed just because the received signal is weak.

One purpose of the present invention is to so organize the transmitting and receiving equipment that the conventional squelch circuit control will be unnecessary, and yet each receiver will be suppressed or closed except when a legitimate signal is to be received. Also, another object of the invention is to so organize this control that the receiver will be sensitive to a signal as long as it is received regardless of the existing noise level.

In mobile communications systems two stations may ordinarily communicate readily with each other without interference from an adjoining channel as long as their space relationships are favorable. At times, however, as when a receiving station for one channel is adjacent the transmitting station of another channel, an off-channel signal from the nearby transmitter may provide a very strong input signal to the receiver. Under the usual operating conditions, each station is most of the time controlled for standby operation, i. e., its receiver is energized but has its output muted by the squelch control and the transmitter is deenergized. The reception of a strong off-channel signal may, despite the strongly selective characteristics of the usual communications receiver, cause the squelch to activate the receiver output circuit so that the signal from the nearby transmitter is heard. This spurious reception is highly objectionable and is most difficult to prevent in commonly used receivers in view of the proximity of the mobile receiver to the transmitting station on the adjacent channel.

The present invention proposes to so organize the communication system that a receiver will respond only to the reception of a signal from a station transmitting on its own channel. In this way the spurious reception will be prevented and no interference will take place. When the transmitting stations transmit on both channels simultaneously, the off-channel signal ordinarily will not be heard even though it may be stronger than the desired signal because of the discrimination against it by the highly selective circuits in the receiver.

Generally speaking, and without making any attempt to describe the exact nature of the invention, it is proposed to have each transmitting station effective to transmit a tone along with a legitimate message, but so organized that this tone is not applied until after the carrier has been established and is removed at the end of the message just before the carrier terminates. Each receiver is then organized to have means for rendering its loud-speaker effective to reproduce a message signal only when such tone is accompanying the carrier signal. Since the tone is applied subsequent to the establishment of the carrier signal, the loud-speaker is not rendered effective to reproduce the message signal until the carrier is fully established; and likewise, the loud-speaker is rendered ineffective before the carrier signal ceases so that no noise tails can be produced by the loud-speaker.

This organization is also effective to prevent the reception of any signal from an adjoining channel because such signal will not contain the tone required to open the output of the receiver. However, all the stations belonging to a group having means responsive to the same tone for a given carrier channel are held in communication with the station then transmitting on that channel and with that tone. In this way, all the stations of a group are kept informed with respect to their own group. This principle can be expanded, if desired, so that the mobile stations associated with the central station may be divided into two or more separate groups for the reception of separate classes of messages and yet provide complete facility of intercommunication between the stations of each group. Under certain conditions as in areas where the desired signal is weak but the noise disturbances are strong, the tone may be satisfactorily received even though the noise appearing in the receiver output is so great as to make the desired signal unintelligible. Accordingly, the organization of one embodiment of this invention has been so devised that the squelch circuit control is still effective to mute the frequency-modulation receiver output even when the tone is being received.

Other objects, purposes and characteristic features of the present invention will be in part obvious from the accompanying drawings, and in part pointed out as the description progresses.

Fig. 1 illustrates in block diagram form the general organization of a typical station constructed in accordance with the present invention to use an audio tone above the voice range of frequencies;

Fig. 1A illustrates a modification of part of the organization of Fig. 1;

Fig. 2 illustrates in block form the general organization of a radio communication system involving one or more fixed stations and one or more mobile stations;

Fig. 3 illustrates diagrammatically the circuit organization of the tone portion of a receiver as used in Fig. 1 and constructed in accordance with the present invention;

Figure 4:
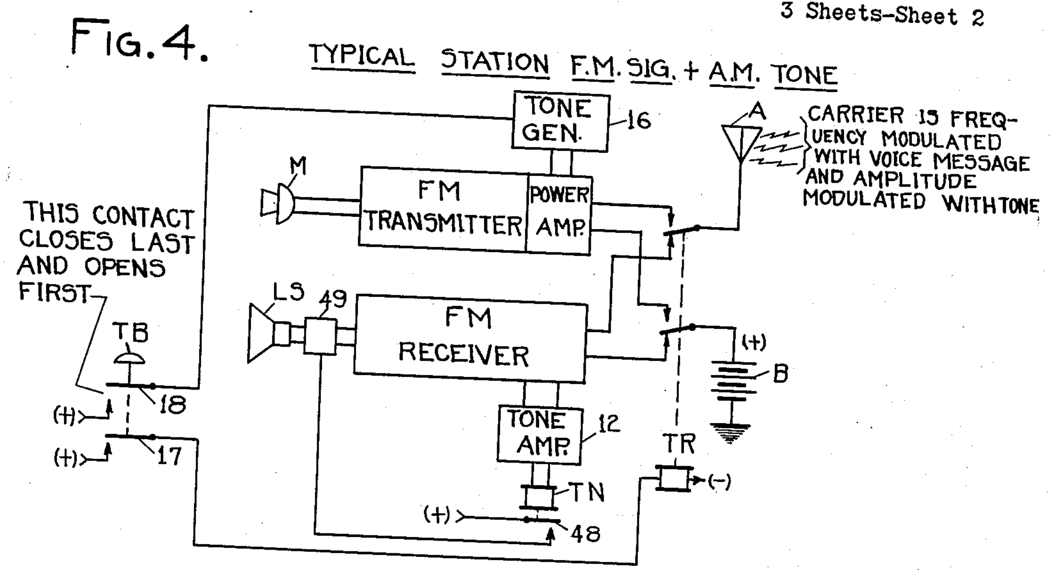
Figure 5:
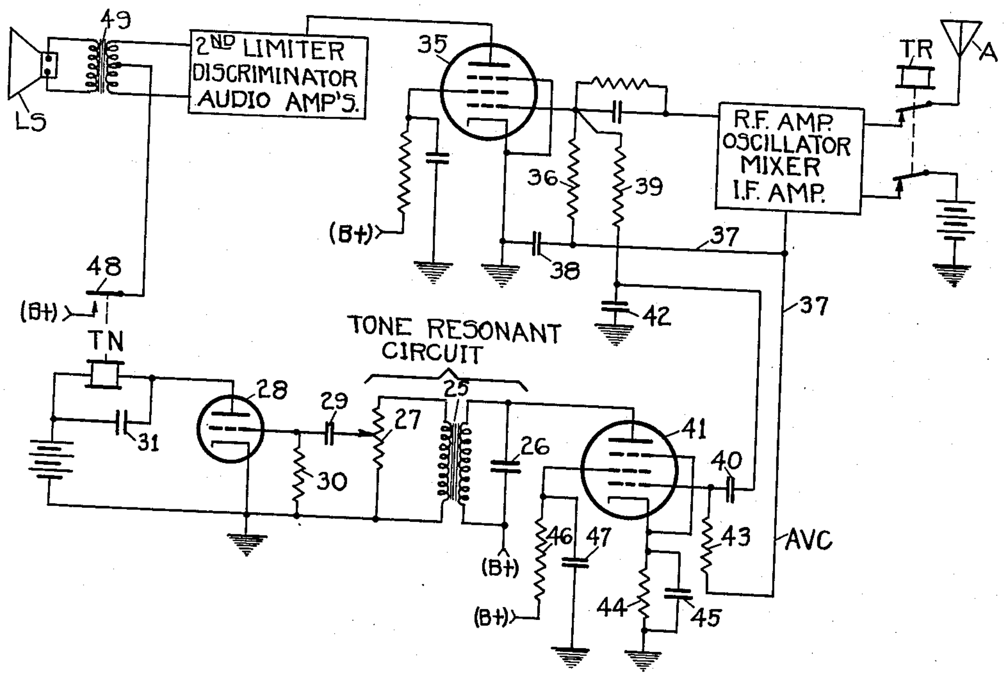

Fig. 4 illustrates in block diagram form the general organization of a typical station constructed in accordance with the present invention to employ frequency modulated carrier signals for the transmission of messages and at the same time amplitude modulating such carrier signals with a relatively low tone frequency; and Fig. 5 illustrates diagrammatically the circuit organization of the receiver employed in Fig. 4 with more particular emphasis placed on the details of the tone detection portion of the organization.

Figure 6:
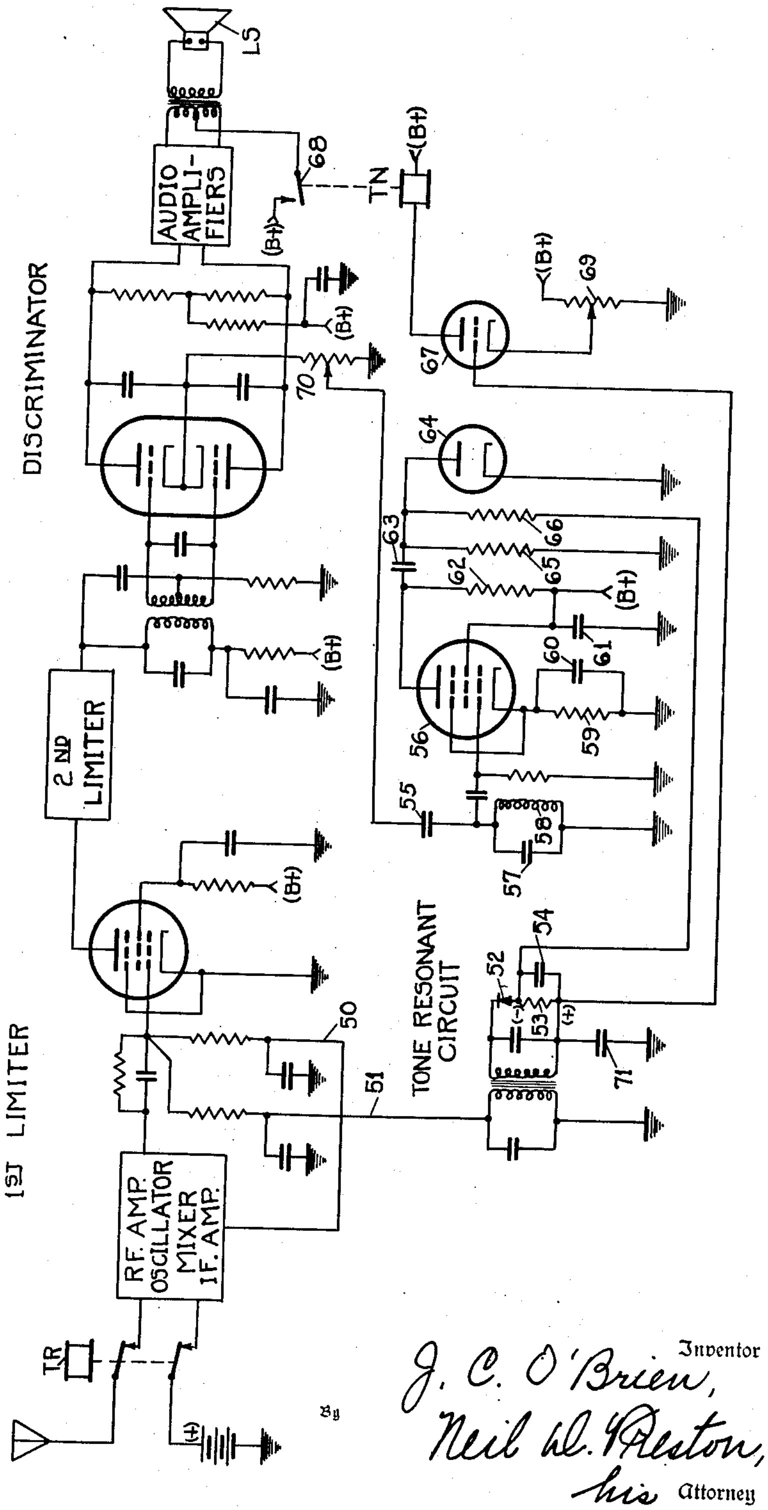

Fig. 6 shows the circuit organization of a frequency-modulation receiver. The reception of tone and the operation of an associated squelch control circuit are both effective to mute the receiver output.

For the purpose of simplifying the illustration and facilitating in the explanation, the various parts and circuits constituting the embodiment of the invention have been shown diagrammatically and certain conventional illustrations have been employed, the drawings having been made more with the purpose in mind of making it easy to understand the principles and mode of operation than with the idea of illustrating the specific construction and arrangement of parts that would be employed in practice. Thus, the various devices are illustrated in a conventional manner and various conventional symbols are used to indicate the various devices, wiring connections, battery, or other sources of electrical current, and the like.

With reference to Fig. 2, it is assumed that two fixed stations, stations 5 and 6, are located at some distance from each other. Station 5 is considered to operate on a radio frequency channel No. 1 and employs a tone A in connection with the transmission of its messages as will be later described in greater detail. Associated with this station 5 is a number of mobile stations, such as stations 7 and 8. These mobile stations have equipment exactly as employed at the fixed station 5 for transmitting and receiving on the radio frequency channel No. 1, and these stations also transmit tone A along with their messages. Fixed station 6 is arranged to transmit and receive on radio frequency channel No. 2 employing tone B. A number of mobile stations of like structure for the same channel and using the same tone B may be associated with the fixed station, such as mobile station 9.

The radio transmitters and receivers at the various stations or locations are assumed to be of the same general type, i. e., amplitude modulation type; frequency modulation type; or the like. Also, the equipment for each group of stations is adjusted to operate on the particular frequency channel designated for that group, and is also arranged to employ the particular tone selected for that group. In connection with the first form of the invention, the selected tone is assumed to be applied to the audio sections of the transmitters and to be received in the audio sections of the receivers. A block diagram of a typical one of these stations has been shown in Fig. 1.

Referring to Fig. 1, it will be seen that a radio transmitter and radio receiver are associated with the usual antenna A and a battery B which supplies the anode potential for the various tubes of the receiver and transmitter, as selected through the contacts of a transmit relay TR. The antenna A and plate supplying battery B are normally connected to the receiver through back contacts 10 and 11, respectively, of the transmit relay TR which is normally deenergized. Thus, the receiver is normally in condition to receive, but associated with the receiver is a tone responsive relay TN controlled from the input to the receiver through a tone amplifier 12. The loud-speaker LS is associated with the receiver and its circuit connections include a tone filter 13 and a back contact 14 of the tone relay TN. Thus, the loudspeaker is normally disconnected although the receiver is ready for the reception of a signal. When the signal for its particular channel, such as channel No. 1, is received accompanied by a tone, the tone relay TN is deenergized closing back contact 14 so that the loud-speaker LS is rendered effective to reproduce the voice message accompanying the carrier signal. As previously mentioned, this tone is not received until after the carrier signal has become established thus eliminating the reception of any noise incident to the establishment of the carrier signal. The tone amplifier 12, of course, facilitates the control of the tone relay as will be described more in detail hereinafter, it being sufficient for the present to know that this tone amplifier is so constructed that the tone relay TN is deenergized only when the particular tone selected for the associated channel is present on the carrier signal. The tone filter 13 is included in the loud-speaker circuit so as to avoid any stray components of the tone from being reproduced by the loud-speaker.

The radio transmitter has associated therewith the usual microphone M and a tone generator 16. This tone generator 16 is normally inactive along with the inactive condition of the transmitter.

In this connection, it should be noted that the form of the invention illustrated in Figs. 1 and 3 is assumed to employ a tone of a frequency somewhat higher than the usual voice frequencies, which tone is impressed onto the usual audio channels of the transmitter and receiver. For example, frequencies between 300 and 3000 may be used for the range of voice frequencies in such a system, so that a tone of any suitable frequency such as 3500 or above might well be employed for the control tone features herein disclosed. It is of course appreciated that the greater the difference between the tone frequency and the voice frequencies, the easier it is to discriminate between them by the use of filters and the like as shown in detail in connection with Fig. 3.

When it is desired to transmit a signal, a transmit button TB is actuated by the operator, and the closure of back contact 17 of this button energizes the transmit relay TR through an obvious circuit. The opening of back contacts 10 and 11 renders the receiver inactive while the closure of front contacts 10 and 11 renders the transmitter available for operation. The transmit button TB has a contact 18 which closes slightly after the closure of contact 17 to connect (+) to the tone generator 16 and thereby render it active. In this way, each time the operator actuates the transmit button TB, the tone generator is rendered active just slightly after the transmitter has been rendered effective. At each of the stations being transmitted to, the reception of tone just subsequent to the reception of carrier prevents the loudspeakers at those stations from being energized until the carrier has been established. Contact 18 also opens just prior to the opening of contact 17 when the operator releases the transmit button 18 at the end of his message. This difference in contact opening time means that the tone generator cease its operation just prior to the rendering inactive of the transmitter. The removal of tone caused by the opening of contact 18 energizes the TN relay at each of the stations to which transmission has just been made, and, after a brief interval corresponding to the pickup time of this relay TN, each receiver loud-speaker is deenergized. Therefore, at the transmitter location, the removal of carrier caused by the dropping away of relay TR does not occur until the tone has been removed for a sufficient length of time to permit the TN relay at each of the remaining stations to pick up and thereby deenergize the loud-speaker. In other words, the time provided for relay TR to drop away, consisting of the time interval between the respective opening of contacts 18 and 17 plus the drop away time, must exceed the pickup time of relay TN.

It may be in some cases desirable to have a longer interval between the establishment of transmission and the application of the tone. This can be accomplished either by mechanical means associated with the contacts 17 and 18 of the transmit button TB, or electrical means may be provided by the provision of a slow-acting relay TC as shown in Fig. 1A. It is assumed that the contact TB of Fig. 1 may be replaced by the transmit button TB1 of Fig. 1A in which the contacts 19 and 20 close at the same time. The contact 19 supplies energy, when closed, to the transmit relay TR the same as contact 17 of Fig. 1. The closure of contact 20 energizes the slow-acting relay TC, which is slightly slow to pick up. The contact 21 does not close until after a brief interval. When this contact 21 is closed, it applies (+) to the tone generator 16 the same as contact 18 of Fig. 1.

At the end of a transmission, the release of the transmit button TB1 opens contacts 19 and 20 simultaneously. The contact 20 opens the circuit for the slow-acting tone generator control relay TC, which immediately drops away opening front contact 21 and removing the energy from the tone generator 16. Also, as soon as relay TC is dropped away, the energizing circuit for relay TR that has been maintained through front contact 22 of relay TC is opened. Therefore, after a brief interval, corresponding to the release time of relay TR, this relay drops away and closes its back contacts 10 and 11. The removal of tone caused by the dropping away of relay TC energizes the TN relay at each of the other stations. After an interval equal to the pickup time of the TN relay these relays pick up, thereby deenergizing the respective receiver loud-speakers. Another consequence of the dropping away of relay TC is the deenergization of relay TR which, when it drops away, removes carrier. The time at which relay TR drops away must thus occur after picking up of the TN relay at each of the stations so that the loud-speaker at each of these stations will be inactive when carrier is removed. In other words, the release time provided for relay TR must be greater than the pickup time of relay TN.

Referring to Fig. 3, the receiver and its organization of Fig. 1 is shown in greater detail. The output power amplifier is assumed to be of the push-pull type and provides an output to a center tap transformer TF through which (B+) is supplied to the plate circuits of this audio-amplifier. The secondary of this transformer TF has a connection through the tone filter 13 which includes an inductance and condenser having such values as to prevent the passage of the tone for which this station is designed. This circuit includes the back contact 14 of the tone relay TN, as previously explained.

The primary of the transformer TF has by-pass condensers 23 shunted across the primary for by-passing the tone frequency which is supplied to a tone resonant circuit including a transformer 25 having primary and secondary windings. The primary winding of this transformer 25 has a tuning condenser 26 connected across it, and the secondary winding has a potentiometer connected across it. The potentiometer serves as a level or volume control for the input to tube 28 having its control grid connected through condenser 29 to the movable tap of the potentiometer. The control grid is also supplied with the grid leak resistor 30. The output circuit of the tube 28 includes the tone relay TN and a suitable plate source of energy, such as battery PS which may be the same source as battery B. A by-pass condenser 31 is shunted across the tone relay TN.

The grid leak input circuit for the tone amplifier tube 28 is so adjusted that when no signal is present, the control grid of the tube is just slightly negative and thus an output is supplied to the tone relay maintaining it normally energized. However, when a signal is received, the condenser 29 and grid leak 30 cooperate to cause a negative bias to be built up on the control grid, thus reducing the average output of the plate circuit of tube 28, and, for this reason the tone relay TN becomes deenergized and drops away closing back contact 14 to allow the loudspeaker LS to reproduce any message that is received. It will be appreciated, of course, that this type of control for tube 28 allows a certain amount of the tone frequency to appear in the output circuit and for this reason the by-pass condenser 31 is provided so that this frequency will not affect the tone relay TN which is highly inductive.

Referring to Fig. 2, it will be clearly understood that this mobile station 7 can readily communicate with the fixed station 5 by each operator taking his turn transmitting and receiving in the usual way. This operation, as above described, is such that the loud-speakers of the respective stations are not rendered effective until the carrier is established and they are rendered ineffective before the carrier ceases and in this way prevents the reproduction of noise while no carrier signal is present. This organization allows the mobile station 7 to move away from the fixed station 5 and continue to have communication even in the fringe areas of reception. This is because in distant locations there may be but little noise and a very weak signal may be received and still be intelligible. However, should a mobile station, such as station 8, move to a position adjacent one or more other stations, such as stations 6 and 9, it is readily apparent that the strength of the signals from these adjacent stations on the adjacent channel No. 2 would be of such a relatively high value as to tend to overcome the discriminatory effect of the tuned circuits and thus crash through to cause spurious reception if it were not for the features of the present invention. The reception of a carrier signal for channel No. 2 does not open the receiving organization of station No. 8 because the tone B does not operate the tone relay of such station. But when a signal is received from station No. 5 accompanied by tone A, the receiver of station No. 8 is opened and proper reception can be had. Obviously, the transmission from station 8 does not affect the receivers of stations 6 and 9 because a different tone is required for those stations.

*Modified forms of the invention*

It is preferable in communication systems of the type used for mobile transmitters and receivers to employ frequency or phase modulation of the carrier wave which may be in a relatively high range of frequencies, as in the order of several hundred megacycles. However, when such high carrier frequencies are employed, it is the practice to allot a relatively narrow channel for each such system with a relatively small portion of the frequency spectrum left free between each of the channels. When a tone frequency is added to the usual voice modulating signal the resulting output signal covers a wider band of frequencies than is allotted to the channel for such system. For this reason, it is highly desirable to employ an organization in which the use of the tone frequency does not materially change the band of frequencies used by the system.

With this in mind, it is proposed in accordance with this form of the invention to transmit the voice messages by frequency or phase modulation of the carrier wave but at the same time to amplitude modulate the carrier wave in accordance with the tone frequency which may be relatively low such as in the order of one hundred cycles. In such a case, the output of the transmitter may be amplitude modulated and not have the band width of the signal cover more than two hundred additional cycles. Obviously, an increase in the band width of two hundred cycles when the original band width covers thousands of kilocycles does not materially reduce the margin between that channel and the adjacent channels on either side. It is of course understood that one hundred cycles is mentioned merely by way of example, and that any suitable relatively low frequency may be employed.

Referring to Fig. 4, it will be noted that the general organization of a typical field station is very similar to that shown in Fig. 1. One distinction is illustrated by showing an FM transmitter as including a power amplifier which has an input to its grid supplied from the tone generator 16 to thereby amplitude modulate the frequency modulated signal supplied to it from the earlier stages of the transmitter. It is believed that this structure of such a transmitter will be well understood to those skilled in the art. Although an FM transmitter and FM receiver have been shown in the drawings, a phase modulation transmitter and receiver could instead be used.

The tone generator 16 is controlled by the contact 18 of the transmit button TB the same as described in connection with Fig. 1. Likewise, the contact 17 of the transmit button TB controls the energization of the transmit relay TR. The contacts 17 and 18 have the same adjustment as described in connection with Fig. 1 so as to provide an interval of time in which the carrier wave may be stabilized before rendering the transmitter operative for adding the tone modulation of the carrier. Also, at the end of such message, the tone frequency is removed first so that the receiver at the receiving station is rendered ineffective to give an output prior to the cessation of the carrier signal. In this connection, it should be understood that if added time intervals are required, the control shown in Fig. 1A may be applied to this Fig. 4 the same as described in connection with Fig. 1.

It will also be noted that since the tone frequency is not injected into the audio channel of the radio receiver, there is no necessity for a tone filter in the loud-speaker input circuit. The tone relay TN is controlled in response to the tone frequency through the tone amplifier 12 the same as previously discussed, but the input through the tone amplifier is supplied in a special manner from the first limiter stage of the FM receiver as more particularly shown in detail in Fig. 5. It is sufficient for the moment to understand that when the tone is received, it affects the deenergization of the tone relay TN and closes back contact 48 to allow the loud-speaker LS to reproduce the voice message.

The FM receiver indicated in Fig. 5, has several component parts including radio frequency stages, oscillator, mixer, intermediate frequency stages, first limiter, second limiter, discriminator, and audio amplifiers for supplying an output to the loudspeaker LS.

It is well understood that the first and second limiter stages are employed in an FM receiving organization to remove variations in amplitude of the input signal. This is because noise is partially represented by amplitude variations and these limiter stages in removing these amplitude variations remove a major source of the receiver output noise. Since the tone frequency in this form of the invention is an amplitude modulation of the carrier wave, it is desirable that such amplitude modulation will be a relatively low percentage, such as in the order of 10 to 30 per cent. The reason for this low degree of modulation is that it is desirable that all of this amplitude modulation be removed by the limiter stages, and yet sufficient signal must be permitted to pass the limiters to provide proper discrimination of the frequency variations to give a faithful reproduction of the voice message. The first limiter stage of an FM receiver develops a voltage at its control grid which when by-passed to ground for both radio and audio frequencies, supplies a direct-current voltage which varies in accordance with the strength of the input signal. This voltage is commonly known as an automatic volume control voltage and abbreviated AVC. This AVC bus is shown in Fig. 5 as taking a voltage from the control grid of the first limiter tube 35 through the resistor 36 and over the bus 37 to the early stages of the receiver and also through resistor 43 to the grid of the tone amplifier 41. The AVC bus 37 is by-passed to ground for both radio and audio frequencies by condenser 38.

Also, the input signal to the first limiter has components of the audio frequency which may be supplied through resistor 39 and coupling condenser 40 to the control grid of the tone amplifier tube 41. This coupling condenser 40 is sufficiently large to allow the free passage of the tone frequency. The resistors 36 and 39 act as decoupling resistors. Also, a condenser 42 is provided to by-pass any radio-frequencies to ground. This tone amplifier tube 41 is preferably operated as Class A with a self-biasing resistor 44 by-passed for audio frequencies by condenser 45. The screen grid is supplied with (B+) through a suitable resistor 46 which is by-passed for audio frequency by condenser 47.

As the strength of the signal varies at the input to the first limiter, the amplitude of the tone signal applied between control grid and cathode of tube 41 varies correspondingly. It is desirable, however, when a tone signal is present that the amplitude of the tone appearing in the output circuit of tube 41 and applied to the tone-resonant circuit be at a relatively constant amplitude. Therefore, tube 41 is preferably chosen to be a variable-mu tube so that the variation of grid bias produced by the AVC voltage varies the amplifier gain in the manner desired. Thus, as the signal strength at the control grid of the first limiter tube 41 increases, for example, the amplitude of the tone voltage at the control grid of tube 41 also increases. The accompanying increase of AVC voltage, however, produces a more negative bias voltage, thereby lowering the gain of the amplifier including tube 41 so that its output tends to remain at a substantially constant amplitude. The application of the AVC to other amplifier stages in the receiver such as the intermediate-frequency amplifiers, for example, tends to maintain the signal level at substantially constant amplitude, thus preventing overloading of these amplifiers at high signal levels with attendant loss of selectivity.

The output of the tone amplifier tube is supplied to the tone resonant circuit involving transformer 25 and tuning condenser 26 the same as discussed in detail in connection with Fig. 3. Obviously, the condenser 26 will have to be of a suitable value to correspond to the resonant frequency of the transformer-condenser combination for the relatively low tone frequency now employed to amplitude modulate the carrier wave. The tone amplifier tube 41 supplies suitable input to the tone resonant circuit and the proper volume can then be supplied to the control tube 28 by the adjustable tap resistor 27, so that when the carrier signal is modulated with the relatively low tone frequency, the control tube 28 will be rendered operative at a relatively low level by reason of the increased bias produced from the condenser grid leak combination (including condenser 29 and grid leak resistor 30). Normally the control tube 28 is operating with its control grid just slightly negative and sufficient plate current flows to allow the tone relay TN to be normally energized, but the presence of the tone frequency negatively biases this control tube 28 and reduces the average output of the tube 28 causing the tone relay TN to drop away the same as described in connection with Fig. 3. The closure of its back contact 48 applies (B+) from a suitable plate source to the midtap of the coupling transformer 49 so that the power amplifier can provide an output to the coupling transformer 49 for rendering the loud-speaker LS capable of reproducing the voice message.

In this way, the amplitude modulation of the signal is employed to provide squelch control for the frequency or phase modulation portion of the signal, the same as previously described in connection with Figs. 1 and 3. Also, this modified form of the invention provides the same features of operation as previously described in connection with Fig. 2 and the first form.

In both forms of the invention, the tone relay TN is shown as being normally energized. This is so that any failure in its control circuit will result in the deenergization of the relay to render the receiver active. For example, if tube 28 should become burned out, the tone relay TN would drop away and the receiver would still operate. This arrangement is more desirable than a normally deenergized circuit arrangement, since a failure of this type is more common than an internal short circuit in the tube which, in the case of a normally deenergized arrangement, will not restore the receiver to the listening condition. However, the tone relay could be normally deenergized and the reception of the control tone be employed to render it active or picked up, if desired. This latter arrangement of control would be more economical from the standpoint of power consumption, but in systems of this type the reliability feature usually is the predominant one.

As has been mentioned, mobile stations may at times operate in areas where received signals are weak but interfering noise is strong. At such times, the tone signal may be suitably received even though the signal that would be heard in the receiver output is unintelligible. The embodiment of the invention shown in Fig. 6 illustrates a circuit organization wherein the reception of tone controls the activation of the receiver output circuit thereby providing the advantages already described and, in addition, muting of the receiver is also dependent upon the operation of a squelch circuit control so that the receiver output may be muted even when the tone signal is received.

The general organization of this embodiment is for the most part similar to that shown in block form in Fig. 4. Thus, the tone frequency is preferably transmitted as an amplitude modulation of a frequency modulated carrier wave. One point of difference lies, however, in the control of relay TN and also with respect to the manner in which this relay controls the receiver output as will be more fully explained.

The FM receiver shown in Fig. 6 includes among its component parts an antenna supplying a signal to the radio frequency amplifiers, an oscillator, mixer, intermediate-frequency amplifiers, first and second limiters, a discriminator, audio amplifiers, and a loud-speaker LS. Also included are a tone resonant circuit, noise amplifier, noise rectifier, and squelch control.

The first limiter stage shown in detail in Fig. 6 is similar to the corresponding first limiter shown in Fig. 5. Thus, an AVC voltage is provided on wire 50 and applied to the intermediate frequency amplifiers for the purposes already explained in connection with Fig. 5. In addition, a tone frequency voltage appears on the wire 51 and is applied to the tone resonant circuit. This tone resonant circuit includes two tuned circuits each resonant to the tone frequency. The secondary tuned circuit is shunted by a rectifier 52 and resistor 53 connected in series. The resistor 53 is shunted by condenser 54 which is of sufficient size to filter the rectified tone-frequency voltage appearing across resistor 53 as indicated by the symbol designating the rectifier 52. The polarity of this rectified voltage appearing across resistor 53 is such as to make the upper terminal of this resistor negative with respect to the bottom terminal whenever the tone signal is applied from the first limiter to the primary tuned circuit of the tone resonant circuit.

The discriminator shown in detail in Fig. 6 is of the center-tuned type, the operation of which is fully explained in my prior application, No. 47,458, filed September 2, 1948, now Pat. No. 2,644,084, dated June 30, 1953. As is also explained in this prior application, amplitude variations of the discriminator input signal which might appear as noise in the receiver output cause an unbalance in the plate currents of the two electron discharge tubes included in the discriminator. This unbalance of plate currents then produces corresponding variations in potential across the resistor 70, and these variations in cathode potential then act degeneratively with respect to the amplification of these tubes, thereby tending to suppress these amplitude variations.

The alternating voltage appearing across resistor 70, therefore, is proportional to the noise which has "escaped" the limiter stages and would otherwise appear in the loud-speaker LS. This alternating voltage is then applied through coupling condenser 55 to the control grid of a noise amplifier tube 56. The parallel tuned circuit including condenser 57 and inductance 58 connected between control grid and ground of tube 56 is resonant to a frequency above the range of voice frequencies appearing in the receiver output as, for example, 15 kc. per second. Since this parallel tuned circuit is resonant only to a particular frequency, it presents a high impedance only to those frequencies and other noise frequencies are shunted to ground and do not appear between the control grid and cathode of tube 56. Since the noise is generally distributed rather evenly over all frequencies, the particular frequency of noise voltage applied to the input of tube 56 is representative of the noise voltage amplitude. By selecting the representative noise voltage to be at a frequency above the voice frequency range, this voltage will be substantially unaffected by discriminator unbalance caused by voice signals.

Grid bias for tube 56 is provided by a cathode resistor 59 which is by-passed for the frequency to be amplified by condenser 60. Screen grid potential is applied from B+, and the screen is by-passed to ground for the frequencies to be amplified by condenser 61. Plate potential is applied from B+ through the load resistor 62. The amplified noise voltage appearing at the plate of tube 56 is applied through coupling condenser 63 to the plate of diode 64 which has included in its plate-cathode circuit the resistor 65. When the instantaneous polarity of the voltage appearing between the plate and cathode of diode 64 is positive, this tube conducts and its plate is then at a very low potential with respect to ground. When the voltage between plate and cathode of tube 64 is negative, however, the diode cannot conduct so that the voltage at its plate becomes correspondingly negative with respect to ground potential. The negative rectified noise voltage appearing at the plate of tube 64 when noise is present is applied through decoupling resistor 66 to the upper terminal of resistor 53 and is filtered by the condensers 54 and 71 which bypass the audio frequencies to ground. Thus, it can be seen that in the circuit from the control grid of squelch control tube 67 through resistor 53, resistor 66, and resistor 65, to ground, two direct voltages are applied in series. In this series circuit, these direct voltages are in opposition, i. e. they are of opposite polarity so that the grid voltage of tube 67 varies according to the difference in amplitude of these two direct voltages.

The squelch control tube has included in its plate-cathode circuit the winding of relay TN so that when this tube conducts plate current, relay TN is energized, thereby closing its front contact 68 to apply (B+) to the audio amplifiers. The cathode of tube 67 is connected to a variable tap on potentiometer 69. Since the opposite terminals of this potentiometer are connected between (B+) and ground, the bias voltage on tube 67 may be varied as desired by movement of the tap on this potentiometer. To obtain the desired operation of this circuit organization, the bias of tube 67 is adjusted so that when the direct voltage across resistor 65 is of low amplitude corresponding to a low noise level and no tone signal is received so that no direct voltage is applied across resistor 53, tube 67 will not conduct sufficient current to pick up relay TN. In other words, even when the combination of signal strength and noise level is such that the noise that would otherwise appear in the receiver output is at a low level, the squelch control tube 67 will not conduct enough plate current to pick up relay TN to activate the receiver output circuit because the necessary tone signal is not then being received. If when the tone is received with the noise still at the same low level, the direct positive voltage across resistor 53 increases, thereby also increasing the grid-cathode voltage of tube 67 sufficiently so that the increased plate current of this tube allows relay TN to pick up. However, if the tone is received but the noise level is of such a magnitude that a large negative direct voltage appears across resistor 65, the voltage applied to the grid of tube 67 decreases, causing relay TN to drop away and remove (B+) from the receiver output circuit. In this way, the operation of relay TN is dependent not only upon reception of the desired tone signal but also upon suitably favorable conditions with respect to the noise that would otherwise appear in the receiver output.

Having thus described two specific forms embodying my invention, it is desired to be understood that these forms are selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention.

What I claim is:

1. In a radio communications system, a transmitter at one station for transmitting a carrier wave selectively modulated according to the intelligence to be transmitted and including means for also modulating said carrier with a steady inaudible tone frequency, manually operable switching means controlling said transmitter and having two electrically independent contacts operated in response to the same manual actuation, the first of said contacts closing just subsequent to the closing of the second of said contacts and opening just prior to the opening of said second contact, circuit means including said second contact for energizing said transmitter to transmit said carrier wave, circuit means including said first contact for causing said carrier to be modulated by said tone, a normally energized receiver at another station tuned to said carrier and including an audio-frequency output circuit, a normally deenergized loud-speaker, tone-responsive means including an electromagnetic relay connected to said audio output circuit and actuated in response to the reception of said tone, circuit means governed by said tone-responsive relay for causing said loud-speaker to be actuated by said audio output circuit when said tone-responsive relay is actuated, and filtering means for preventing said tone from being reproduced by said loud-speaker, whereby radio signals received by said receiver not modulated by said tone frequency do not cause energization of said loud-speaker, and whereby noise associated with the application and removal of said carrier is not heard in said loud-speaker.

2. A radio communications system comprising, a transmitter at one location for transmitting a selectively voice-frequency modulated carrier wave and including means for also selectively modulating said carrier wave with a steady tone having a frequency different from said voice frequencies, manually operable switching means for simultaneously energizing upon closure of the contacts thereof a quick pickup transmitting relay and a slow pickup tone control relay, circuit means responsive to the picked up condition of said transmitting relay for causing said transmitter to transmit a carrier wave, circuit means responsive to the picked up condition of said tone control relay to modulate said carrier wave with a steady tone frequency, a receiver at another location including a sound reproducer and means for energizing said sound reproducer with said transmitted voice signal, circuit means including a tone relay associated with said receiver and normally energized to maintain said sound reproducer deenergized, said transmitting relay associated with said transmitter having a longer release time than the pickup time of said tone relay associated with said receiver, whereby closure of said contacts of said switching means causes said tone to modulate said carrier slightly subsequent to establishment of said carrier and opening of said contacts causes said tone to be removed from said carrier a sufficient length of time prior to the removal of said carrier to permit said tone relay associated with said receiver to pick up and deenergize said sound reproducer, whereby noise accompanying the application and removal of a carrier is not heard in said sound reproducer.

3. A radio communications system having a plurality of stations and comprising, a transmitter at one location with means for transmitting a carrier wave frequency modulated with the intelligence to be transmitted and amplitude modulated with a distinctive tone frequency, a receiver at another location including, means responsive to said frequency modulation for energizing a loud-speaker according to said transmitted intelligence, a discriminator having an un-by-passed cathode resistor for providing a first alternating voltage proportional to the noise appearing in said loud-speaker, a grid-leak biased amplitude limiter, circuit means connected to the control grid of an electron discharge tube included in said limiter for providing a second alternating voltage proportional to the amplitude variations of said carrier, resonant circuit means tuned to said tone frequency and an associated rectifier having said second alternating voltage applied thereto for providing a direct voltage when said tone signal is received, amplifier means for increasing the amplitude of said first alternating voltage, rectifying and filtering means associated with said amplifying means for providing a direct voltage proportional to said noise appearing in said loud-speaker, a relay control tube having its grid bias governed by said direct current voltages in series, a plate-cathode circuit of said relay control tube including an electromagnetic relay, means governed by said relay for muting said receiver output when said relay is deenergized, whereby said relay control tube conducts sufficient plate current to pick up said relay only when said tone is received and said noise is simultaneously at a suitably low level.

4. In a radio communication system, a transmitter at one location capable when rendered effective to transmit a carrier wave modulated by a voice message and also including a tone modulator for modulating said carrier wave with an inaudible tone frequency, manually operable switching means for rendering said transmitter effective and also for rendering said tone modulator effective, said switching means being constructed to cause said tone modulator to discontinue its operation prior to the cessation of the transmission of the carrier wave when said manually operable switching means is manually released, a receiver at another location normally in condition to receive said carrier frequency and having an audio frequency output circuit and an associated loudspeaker, said audio output circuit being normally ineffective to supply an input to the associated loudspeaker, a tone responsive means including an electromagnetic relay connected to said receiver and actuated in response to the reception of said tone frequency, and circuit means governed by said tone responsive relay when said tone is received for rendering said audio output circuit effective to supply an input to said loudspeaker, whereby said audio output circuit is rendered ineffective by the release of said tone relay just prior to the cessation of the carrier frequency to thereby prevent unwanted noise from being reproduced by said loudspeaker.

5. In a radio communication system, a transmitter at one location effective to transmit a carrier wave modulated by voice messages and also by an inaudible tone frequency, a receiver at another location normally in condition to receive radio carrier waves from said transmitter and including an audio output circuit and a loudspeaker, a relay effective only upon actuation to connect said loudspeaker to said audio output circuit, a squelch control tube having an output circuit including said relay in series and also having an input grid control circuit, circuit means including a center tuned discriminator comprising a pair of electron tubes having a common cathode biasing resistor across which noise voltages present in said audio output circuit are developed, means coupling said resistor to said squelch tube input grid control circuit for producing a negative voltage in said grid control circuit proportional to the amplitude of said noise voltages, and other circuit means including a filter and rectifier for producing a positive voltage in said grid control circuit proportional to the amplitude of the received tone frequency, whereby said relay is energized by said control tube to render said loudspeaker effective only when a tone frequency is received and the amplitude of the noise voltages is relatively lower.

JOHN C. O'BRIEN.

References Cited in the file of this patent

UNITED STATES PATENTS

| Number | Name | Date |
|---|---|---|
| 2,187,603 | Hall | Jan. 16, 1940 |
| 2,321,651 | Caraway, Jr. | June 15, 1943 |
| 2,395,738 | Hanson | Feb. 26, 1946 |
| 2,479,305 | Brown | Aug. 16, 1949 |
| 2,546,987 | Eannarino | Apr. 3, 1951 |
| 2,547,024 | Noble | Apr. 3, 1951 |

FOREIGN PATENTS

| Number | Country | Date |
|---|---|---|
| 611,203 | Great Britain | Oct. 26, 1948 |